Jan. 3, 1956  A. L. GOUNER  2,728,917
PANELED NECKTIE AND METHOD OF MANUFACTURE
Filed Dec. 7, 1953  4 Sheets-Sheet 1
Fig.1.  Fig.2.  Fig.4.  Fig.6.  Fig.8.
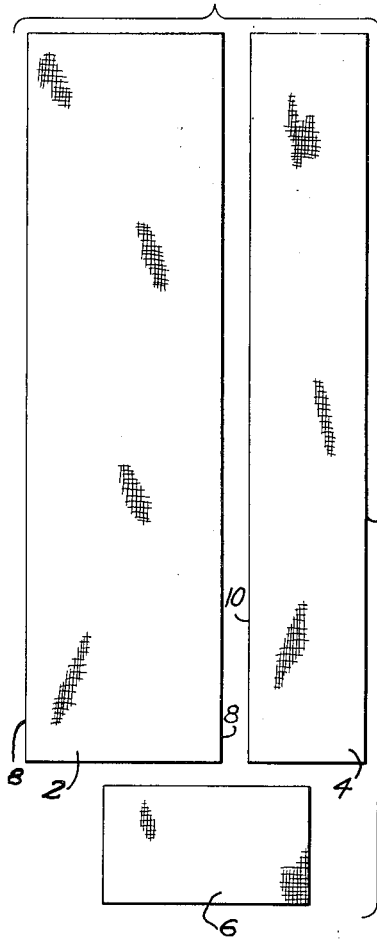
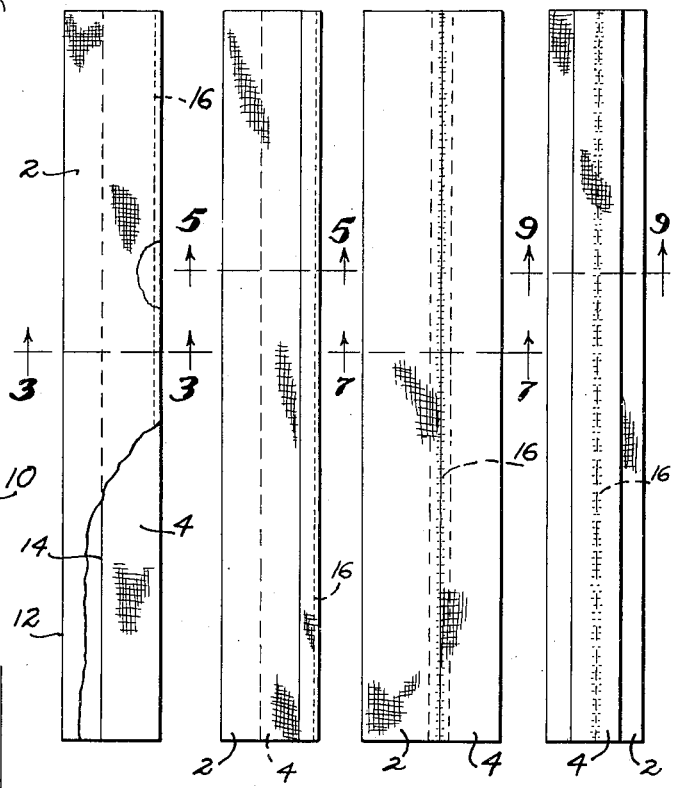
Fig.7.
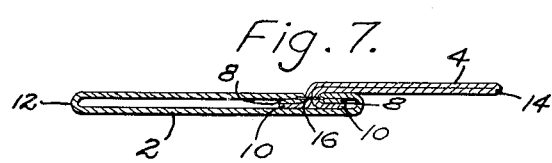
Fig.3.
Fig.9.
Fig.5.
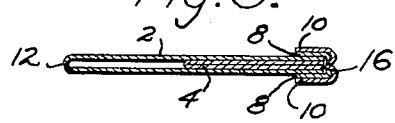
INVENTOR
Aubrey L. Gouner
BY Scrivener & Parker
ATTORNEYS Jan. 3, 1956  A. L. GOUNER  2,728,917
PANELED NECKTIE AND METHOD OF MANUFACTURE
Filed Dec. 7, 1953  4 Sheets-Sheet 2
Fig. 10.
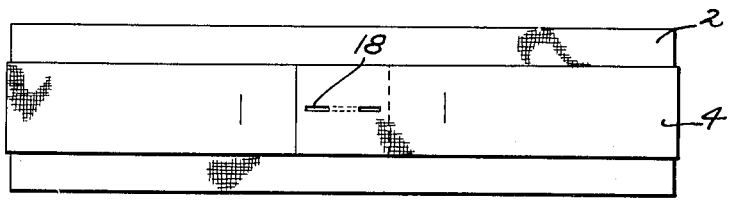
Fig. 11.
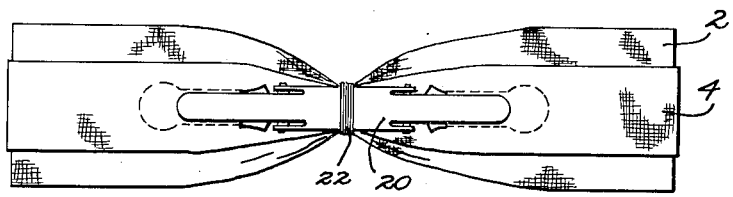
Fig. 12.
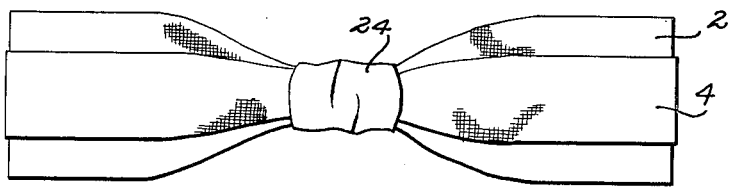
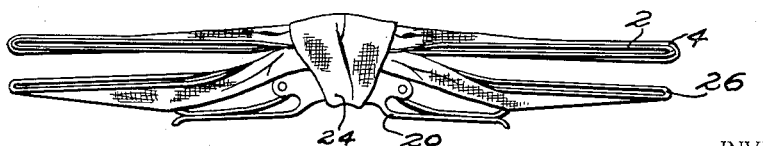
Fig. 12 A.
INVENTOR
Aubrey L. Gouner
BY Scrivener & Parker
ATTORNEYS Jan. 3, 1956 A. L. GOUNER 2,728,917
PANELED NECKTIE AND METHOD OF MANUFACTURE
Filed Dec. 7, 1953 4 Sheets-Sheet 3
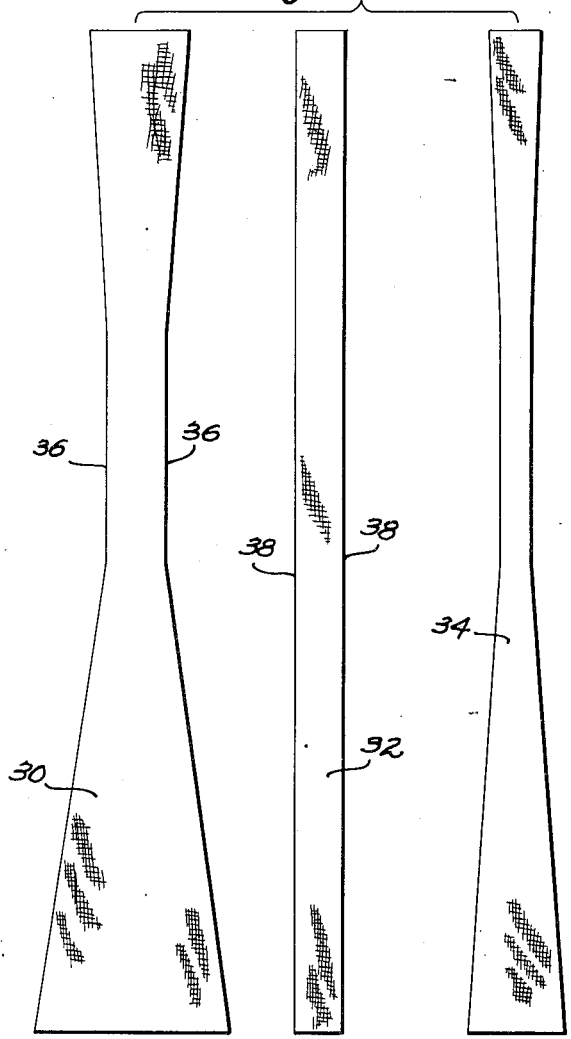
Fig. 13. Fig. 14. Fig. 16.
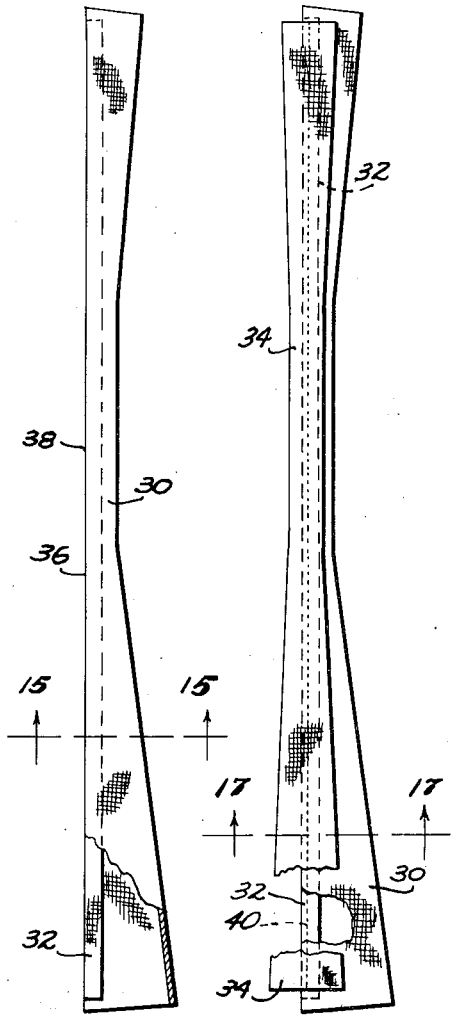
Fig. 15.
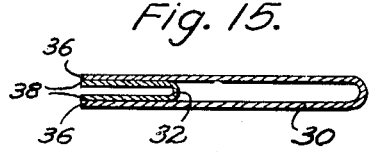
Fig. 17.
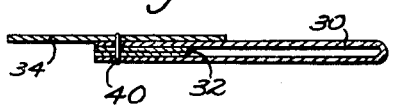
Fig. 18.
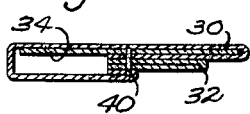
INVENTOR
Aubrey L. Gouner
BY Scrivener & Parker
ATTORNEYS Jan. 3, 1956 — A. L. GOUNER — 2,728,917
PANELED NECKTIE AND METHOD OF MANUFACTURE
Filed Dec. 7, 1953 — 4 Sheets-Sheet 4
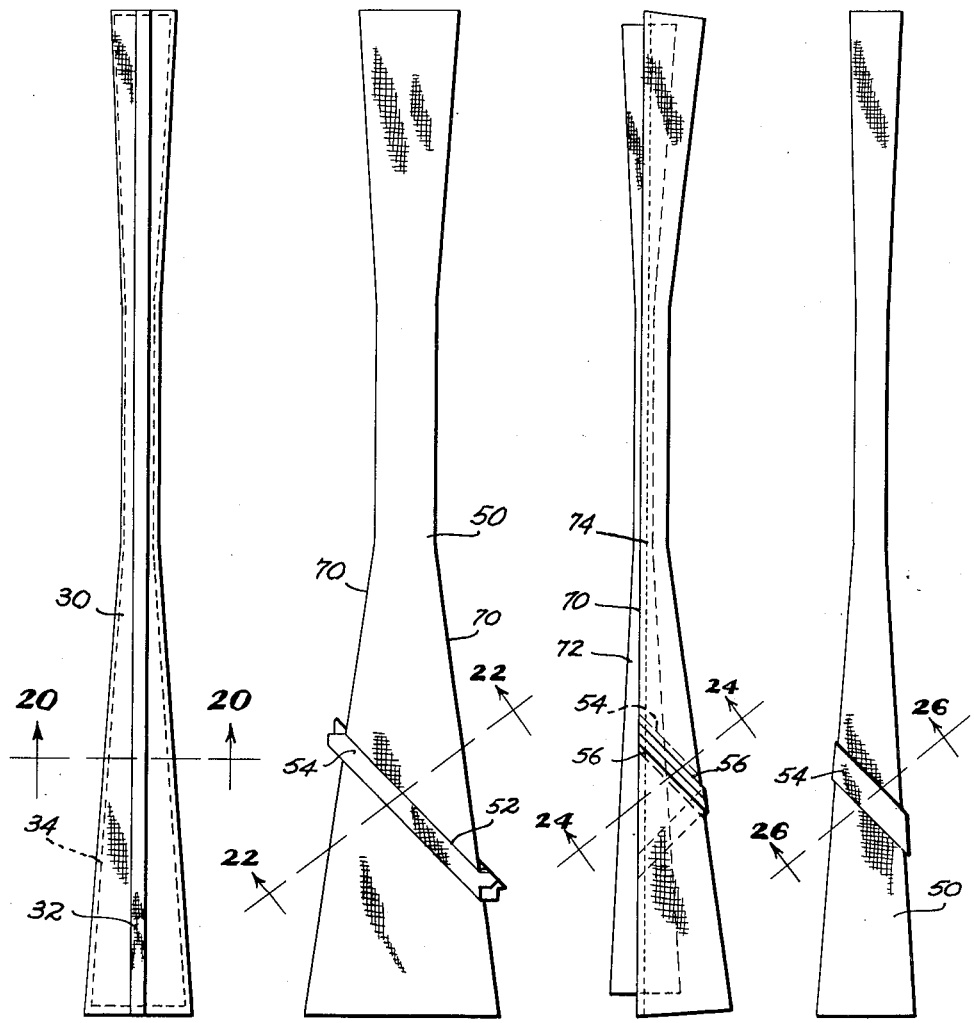
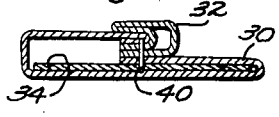
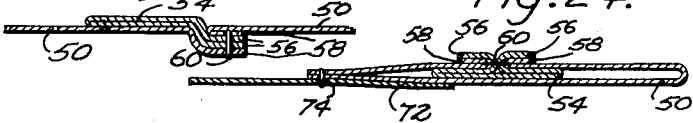
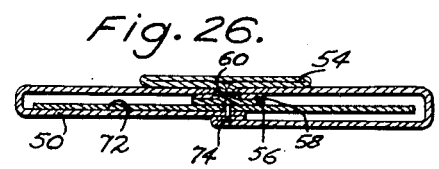
INVENTOR
Aubrey L. Gouner
BY Scrivener & Parker
ATTORNEYS

United States Patent Office 2,728,917
Patented Jan. 3, 1956

2,728,917

PANELED NECKTIE AND METHOD OF MANUFACTURE

Aubrey L. Gouner, New Orleans, La., assignor to Wembley, Inc., New Orleans, La., a corporation of Louisiana Application December 7, 1953, Serial No. 396,424

1 Claim. (Cl. 2—146)

This invention relates broadly to neckwear and, more particularly, to men's neckwear such as four-in-hand neckties and bow ties, and to methods of making such neckwear.

It has been the particular object of this invention to provide an article of neckwear, such as a four-in-hand or bow necktie, having a main body part and an exterior panel consisting of a separate piece of fabric superposed on the main body part and united to it by a seam which is not visible when the necktie is worn in the usual and intended manner, thus providing a necktie having a new, unusual and pleasing appearance. It has also been a principal object of the invention to provide a method of making a necktie having such an exterior panel, which method may be easily and cheaply practised and which will result in the addition of the panel to the main body of the necktie with only a minimum number of operations added to those normally required to make a necktie.

Other objects and features of novelty of the invention will be made apparent by the following description and the annexed drawings which disclose certain embodiments and steps according to the invention which, it will be understood, are only illustrative of the invention and impose no limits thereon not imposed by the appended claim.

In the drawings forming part of this application,

Fig. 1 is a plan view showing the three parts required to form the main body part of a bow tie having an external panel according to this invention;

Figs. 2, 4, 6 and 8 are plan views showing successive steps in the manufacture of a part of a bow tie;

Figs. 3, 5, 7 and 9 are cross-sectional views taken on lines 3—3, 5—5, 7—7 and 9—9 of Figs. 2, 4, 6 and 8, respectively;

Figs. 10, 11 and 12 show successive steps in the manufacture of a bow tie using the paneled part disclosed in Figs. 2 to 9;

Fig. 12A is a top view of a bow tie having two bows, one or both of which may have an external panel according to this invention;

Fig. 13 is a plan view showing the three component parts of a four-in-hand necktie having a panel according to this invention;

Figs. 14, 16 and 19 are plan views showing successive steps in the manufacture of a four-in-hand necktie using the parts illustrated in Figure 13;

Figs. 15 and 17 are enlarged cross-sectional views taken on the lines 15—15, and 17—17 of Figs. 14 and 16, respectively;

Fig. 18 is a cross-sectional view taken on the same line as Fig. 17 but showing the parts of the necktie after being turned;

Fig. 20 is a cross-sectional view taken on line 20—20 of Fig. 19;

Fig. 21 is a plan view of the main body part of a four-in-hand necktie which is to have a diagonal panel in accordance with this invention;

Figs. 23 and 25 are plan views showing successive steps in the making of a four-in-hand necktie using the part illustrated in Fig. 21, and Figs. 22, 24 and 26 are cross-sectional views taken on the lines 22—22, 24—24 and 26—26 of Figs. 21, 23 and 25, respectively.

By this invention I provide a necktie of the four-in-hand, bow or other type having a main body part which is visible when the necktie is worn in the usual and intended manner and also having an exterior panel or strip of material superimposed on the main body part of the necktie and joined thereto by a seam which is hidden by the strip or panel itself and is not visible. This panel, which may be made of a material, or have a color, which is different from that of the main body part of the necktie, causes the necktie to have an unusual and pleasing appearance greatly enhancing its acceptance and value. In accordance with the invention the panel may be arranged on the tie in any desired position and, for example, may extend longitudinally of the necktie, in the center thereof, or may extend diagonally of the necktie or may be disposed otherwise with respect to the tie.

In Figs. 1 to 12 of the drawings forming part of this application there are disclosed the successive steps in the manufacture of a bow tie having at least one part having an exterior panel according to this invention. The successive steps in the making of this part, which is the main body part of the tie, are shown in Figs. 1 to 9. In Fig. 1 there are illustrated the three parts required to make a bow tie having a paneled part, by which I refer to a part having a panel according to this invention, these parts being the main body part 2, the panel part 4 and the knot-forming part 6. The main body part 2 is preferably of the same length as the panel part 4 and is substantially wider. The knot-forming part 6 is a rectangular piece of fabric and is conventional in the art of making pre-tied bows and need not be particularly described. Each of these three parts has a face side which is the outside, or visible, face of the material when the necktie is worn in the usual and intended manner.

In accordance with the invention the main body part of the bow tie is formed from the main body piece 2 and panel piece 4. The main body part is folded about its longitudinal center line with its face side inside to bring its side edges 8 into coincidence and the panel piece 4 is also folded about its longitudinal center line with its face side outside to bring its side edges 10 into coincidence. The folded panel part 4 is then placed within the folded body part 2 with the free edges 8 of the body part 2 coinciding with the free edges 10 of the panel part as shown in Fig. 3. The folded edges 12, 14 of the two parts will be parallel but will be spaced apart because of the greater width of the main body part. These folded parts are now united by a line of stitching 16 extending from end to end of the parts just inside the free edges 8, 10 and joining all four plies, thus forming two tubes, one within the other. The free edge parts 8, 10 outside the stitching 16 are now turned back in opposite directions onto the opposite outer faces, respectively, of the main body part 2 and are pressed into these positions as shown in Figs. 4 and 5. After this has been done the tubular main body part 2 is turned right side out from end to end, resulting in two tubular pieces of material lying side by side with the free longitudinal edges 10 of the panel piece being sandwiched between the edges of the tubular main body part 2 and united thereto by the stitching 16, as shown in Figs. 6 and 7 which, it will be observed, lies wholly within the outer tube. In turning the main body part 2 right side out the tubular panel part 4 will not be turned and will remain with its face side outside, so that after the turning each tubular part will have its face side outside. The tubular panel part 4 may now be shifted laterally to center it with respect to the tubular main body part 2, as shown in Figs. 8 and 9, although it need not be centered unless this is desired. The parts may now be pressed, as by ironing, to set them in finished, flattened condition and remove any wrinkles.

The body part formed in the described manner will have a central panel formed by the flattened tubular panel part 4 which, in the described embodiment, extends longitudinally and centrally of the main body part and is of less width than such part, thereby providing the appearance of a stripe or panel superimposed on the main body part and, if desired, being of contrasting color or material. The seam 16 which joins the panel to the body part is not visible in the normal and intended manner of wearing the tie, being hidden by the panel itself.

The steps followed in completing the bow tie are shown in Figs. 10, 11 and 12 and are conventional. As shown in Fig. 10, the ends of the main body part 2, with the superimposed panel 4, are brought together and stapled, as at 18, to form a flattened annulus. A metal clip 20 is attached to the back of this annulus over the staple 18, as by thread 22 wrapped around the clip and the parts 2, 4, and the knot-forming fabric piece 6 is then brought over the thread 2 and wrapped around the entire assembly to form the knot, as shown at 24 in Fig. 12. The paneled part, made in the described manner, may be used by itself to form a bow tie, as shown in Figs. 10, 11 and 12, or, if desired, it may be combined with another plain or paneled part 26 to from a double bow tie, as shown in Fig. 12A.

My invention may be employed in the manufacture of any kind of neckwear and in Figs. 13 to 19 of the drawings there are shown the successive steps in the manufacture of a lined, four-in-hand necktie having a superimposed panel of the type provided by the invention extending longitudinally and centrally of the necktie from end to end of the outer face thereof. The three basic elements of such a necktie are shown in Fig. 13 and are the outer material piece 30, the panel piece 32 and the lining piece 34. The outer material piece and the lining piece are of conventional size and shape and, in the disclosed embodiment, the panel piece is rectangular in shape and the same length as the outer material piece.

In the manufacture of a four-in-hand necktie with the parts illustrated in Fig. 13, the outer material piece 30 is first folded about its longitudinal center line, with its face side inside, to bring its side edges 36 into coincidence and the panel piece 32 is folded about its longitudinal center line, with its face side outside, to bring its side edges 38 into coincidence. The folded panel piece 32 is placed within the folded outer material piece 30 with the four free edges 36, 38 of these two parts in coincidence, as shown in Figs. 14 and 15. The lining piece 34 is now superimposed on the folded, telescoped pieces 30, 32 with its longitudinal center line placed just inwardly of the coinciding free edges 36, 38. As shown in Figs. 16 and 17, all of these parts are now united by a line of stitching 40 extending from end to end of the superimposed parts and uniting the four plies of the two folded pieces and the single ply of the lining piece, thus forming the outer material piece 30 into an outer tube and the panel piece 32 into a tube which is disposed within the tubular outer material piece 30. The tubular outer material piece 30 is now turned so that its face side is outside. When this is done the outer material tube and the panel tube will have their face sides outside, the panel tube will be outside the outer material tube with its edge parts 38 within the edge parts 36 of the outer material tube and united thereto by the stitching 40, and the lining piece will be within the outer material tube 30, all as shown in Fig. 18. In order to provide a panel extending along the longitudinal center of the outer material piece, the panel piece is shifted laterally from its position as shown in Fig. 18, in which it lies in flat face-to-face engagement with the outer material piece at one side of the center-line thereof, to the position shown in Figs. 19 and 20 in which it lies along the longitudinal center line of the tie and extends equidistantly to each side thereof, thus providing an external, longitudinal panel having the appearance of a stripe of separate material superimposed on the main body of the necktie and, if desired, colored in contrast to the main body of the necktie or formed of a different material.

In the embodiments of the invention which have been described, the panel is disposed longitudinally of the necktie. Other arrangements of the panel may be made, however, within the scope of the invention and in Figs. 21 to 26 there are disclosed the steps in the manufacture of a four-in-hand necktie having an external panel piece superimposed on the outer face thereof and extending diagonally of the necktie, i. e. at an angle to the longitudinal center line thereof. In the manufacture of such a necktie the outer material piece 50 is first cut along a diagonal line 52 at a place or location in the large end of the piece which will be visible when the necktie is worn in the usual and intended manner. A rectangular panel piece 54 is now folded about its longitudinal center line with its right side outside, bringing its free edges 56 into coincidence, and the free edges 58 of the diagonally-cut outer piece 50 are placed on each side of the edges 56 and in coincidence therewith, the folded tube formed by the panel piece extending to the face side of the outer material piece. These four plies of fabric are now united by a line of stitching 60 which extends parallel to and just inside the four coinciding, superposed free edges 56, 58.

A necktie may be made from the outer material piece having the inset panel described above, and in Figs. 23 to 26 there are disclosed the successive steps in the manufacture of a lined four-in-hand necktie using this outer material piece. The piece 50 is first folded about its longitudinal center line with its face side inside to bring its side edges 70 into coincidence, it being remembered that the tubular panel piece 54 which is inset into the body piece 50 has its face side outside. A lining piece 72 is placed on the folded outer material piece with its longitudinal center line spaced just inwardly of the coinciding side edges 70 and a line of stitching 74 is run along the center line of the lining piece to form the outer material piece into a tube and unite the lining piece to it. This step is illustrated in Fig. 23 and the relation of the various parts after this step is shown in Fig. 24. The tubular outer material piece is now turned to bring its face side outside and when this is done the panel tube 54 will be superimposed on the outer face of the necktie, as shown in Figs. 25 and 26, extending diagonally across the necktie and having its edge parts 56 united to the fabric of the outer material part 50 by the stitching 60. While I have described and illustrated certain embodiments of my invention and certain methods of practising it, it will be apparent to those skilled in the art that other embodiments, methods and steps, as well as modifications of those disclosed, may be made and practised without departing in any way from the spirit and scope of the invention, for the limits of which reference must be had to the appended claim.

What is claimed is:

A necktie comprising a flat elongated outer material tube having a front face and a rear face and having the longitudinal edges coincident with each other and co-extensive with the longitudinal center line of the front face said edges being folded to project inwardly along said line, an elongated flat panel tube having a front face and a rear face and having the longitudinal edges coincident with each other and co-extensive with the longitudinal center line of the rear face, said edges being folded to project outwardly of said tube, said last named edges being sandwiched between the inwardly projecting edges of the first named tube so that said panel tube lies superposed on the front face of said outer tube symmetrically disposed on either side of the longitudinal center line of said outer tube, and a single line of stitching uniting the edges of said tubes and extending substantially from end to end of the two tubes and lying wholly within the outer tube.

References Cited in the file of this patent

UNITED STATES PATENTS

| | | |
|---|---|---|
| 704,569 | Oppenheimer | July 15, 1902 |
| 1,186,321 | Lewin | June 6, 1916 |
| 2,040,386 | Keiser | May 12, 1936 |
| 2,082,447 | Gold | June 1, 1937 |
| 2,499,286 | Trau | Feb. 28, 1950 |

FOREIGN PATENTS

| | | |
|---|---|---|
| 393,773 | Great Britain | June 15, 1933 |